United States Patent [19]
Nakel et al.

[11] Patent Number: 4,737,375
[45] Date of Patent: Apr. 12, 1988

[54] BEVERAGES AND BEVERAGE CONCENTRATES NUTRITIONALLY SUPPLEMENTED WITH CALCIUM

[75] Inventors: Gunther M. Nakel, Aurora, Ind.; Wendy E. Russell, Fairfield, Ohio; Timothy W. Dake, Cincinnati, Ohio; David C. Heckert, Oxford, Ohio

[73] Assignee: The Procter & Gamble Company, Cincinnati, Ohio

[21] Appl. No.: 813,744

[22] Filed: Dec. 26, 1985

[51] Int. Cl.$^4$ .................................................. A23L 2/00
[52] U.S. Cl. .................................... 426/590; 426/548
[58] Field of Search ............... 426/548, 590, 591, 650, 426/74, 477

[56] References Cited

U.S. PATENT DOCUMENTS

| | | |
|---|---|---|
| 2,325,360 | 7/1943 | Ayres et al. . |
| 2,851,360 | 9/1958 | Diller . |
| 2,868,646 | 1/1959 | Schapiro . |
| 2,985,562 | 5/1961 | Millard et al. . |
| 3,114,641 | 12/1963 | Sperti et al. . |
| 3,657,424 | 4/1972 | Aktins et al. . |
| 3,939,289 | 2/1976 | Hornyak et al. . |
| 3,965,273 | 6/1976 | Stahl . |
| 3,968,263 | 7/1976 | Reussner . |
| 4,001,448 | 1/1977 | Finucane et al. . |
| 4,127,645 | 11/1978 | Witzer . |
| 4,448,770 | 5/1984 | Epting . |
| 4,551,342 | 11/1985 | Nakel et al. . |

FOREIGN PATENT DOCUMENTS

| | | |
|---|---|---|
| 75114 | 3/1983 | European Pat. Off. . |
| 117653 | 9/1984 | European Pat. Off. . |
| 2219778 | 9/1984 | France . |
| 54-8767 | 1/1979 | Japan . |
| 56-97248 | 8/1981 | Japan . |
| 58-128110 | 7/1983 | Japan . |
| 59-3710 | 2/1984 | Japan . |
| 8604815 | 8/1986 | PCT Int'l Appl. . |
| 8604814 | 8/1986 | PCT Int'l Appl. . |
| 2095530 | 10/1982 | United Kingdom . |

Primary Examiner—Raymond N. Jones
Assistant Examiner—Carolyn Paden
Attorney, Agent, or Firm—Eric W. Guttag; Ronald L. Hemingway; Richard C. Witte

[57] ABSTRACT

Beverages and beverage concentrates nutritionally supplemented with significant levels of solubilized calcium are disclosed. The beverages and concentrates are substantially free of a sugar alcohol and contain specified levels of total edible acids selected from mixtures of citric, malic and phosphoric acid. The weight ratio of total acids to calcium, as well as the particlar acid mixtures, are selected to provide beverages and concentrates having good stability against precipitation of insoluble calcium salts, satisfactory initial taste/mouthfeel, substantial freedom from objectionable aftertaste and desirable calcium absorbability/bioavailability properties.

20 Claims, 4 Drawing Sheets

BEVERAGES AND BEVERAGE CONCENTRATES NUTRITIONALLY SUPPLEMENTED WITH CALCIUM

This application relates to beverages and beverage concentrates for preparing same which are nutritionally supplemented with significant levels of calcium.

Dietary calcium inadequacy may be a contributing cause to osteoporosis, at least for some populations. For example, a positive correlation between calcium intake and bone mass has been found across many age groups. It has also been suggested that the level of calcium intake early in life directly influences the peak bone mass achieved at skeletal maturity.

During the period of late teenage to young adulthood, it has been found that a significant reduction in dietary calcium intake typically occurs. This is especially true of the female population where reduced dietary calcium intake usually happens much earlier in life compared to their male counterparts. Accordingly, females, as a class, are especially susceptible to a prolonged calcium deficit over their life span. This calcium deficit may be one reason for the greater incidence of osteoporosis in postmenopausal women.

Calcium can be obtained from a variety of dietary sources. The primary sources of calcium are dairy products, in particular milk. Milk provides a very valuable source of dietary calcium. However, beginning in young adulthood and continuing through later life, milk is typically not consumed in sufficient quantities by the general population to obtain needed levels of calcium. This may be caused by the unattractiveness of milk as a drink for "social occasions". Indeed, it has been found that teenage girls, and especially young adult women, generally find milk to be a socially unattractive drink, as well as too caloric and unappealing in taste.

To achieve greater consumption of calcium, a more appealing alternative to milk is apparently needed. This alternative must be one which is consumed in sufficient quantities to provide nutritionally beneficial amounts of calcium. Products which are consumed in great quantities by teenagers and young adults are carbonated soft drinks. Unlike milk, soft drinks can be formulated with a variety of flavors generated by natural flavor oils, flavor extracts and synthetically derived flavor materials. The numerous flavor impressions possible may be the reason why soft drinks are very attractive to this particular group. Accordingly, soft drinks nutritionally supplemented with calcium could be viewed as a potential vehicle for achieving greater dietary calcium intake during this critical teenage/young adult period, and throughout life as well.

Nutritional supplementation of soft drinks, or other non-milk beverages, with significant levels of calcium is not straight forward. Milk contains, on average, about 0.12% calcium by weight. Inclusion of such a high level of calcium in a soft drink requires consideration of a number of issues.

One is making sure that the calcium supplemented drink has desirable taste and mouthfeel qualities. It has been found that high levels of calcium can impart significant "chalky" mouthfeel sensations to a soft drink. This has been found to be especially true for soft drinks based on high levels of citric acid as the acidulant. In addition, it has been found that high levels of calcium can cause undesirable "biting/burning" mouthfeel sensations long after the soft drink is consumed. This "after-taste" problem is especially true of soft drinks based on high levels of phosphoric acid as the acidulant.

Another potential issue is precipitation of insoluble calcium salts such as calcium citrate and calcium phosphate. Stability against precipitation is a very significant problem for beverage concentrates used to prepare soft drinks because of the very high levels of calcium salts present. However, at even moderate concentrations in drinkable beverages, stability against precipitation of insoluble calcium salts can be important.

Another factor which must be considered is the absorbability and bioavailability of the calcium from the soft drink. As used herein, "absorbability" refers to the amount of calcium which ends up in the blood serum. As used herein, "bioavailability" refers to the ability of the calcium to reach the site of bioactivity, i.e., bone. Milk is likely to be the standard against which absorbability and bioavailability of calcium from a non-milk beverage will be measured. Accordingly, to the extent possible, a calcium supplemented soft drink should desirably approach milk in terms of absorbability and bioavailability of calcium.

BACKGROUND ART

European Patent application No. 117,653 to Nakel et al, published Sept. 5, 1984, discloses beverage compositions which comprise specific mixtures of cations (calcium, potassium and magnesium), as well as specific mixtures of acids (citric malic, and phosphoric acid), to provide desirable flavor impressions, in particular body, while being stable against precipitation of insoluble salts, in particular, calcium salts. Embodiments 2, 4, 5, 7, and 8, disclose beverages containing 0.035 to 0.045% by weight calcium. The weight ratios of total acids to calcium for these embodiments range from 13 to 26.

Japanese Patent Document No. 56-97248 to Kawai, published Aug. 5, 1981, discloses methods for manufacturing calcium malate/citrate compositions. These compositions can be made by dissolving more than 30% malic acid and less than 70% citric acid in water, neutralizing this solution with calcium hydroxide or calcium carbonate, and then recovering the crystalline precipitate. The weight ratio of total acids to calcium for practical Examples 1 and 2 appears to be about 3.26.

Japanese Patent Document No. 54-8767 to Kaji et al, published Jan. 23, 1979, discloses a calcium enriched soft drink containing salts of food organic acids such as calcium citrate, calcium malate, calcium lactate, calcium tartrate, and so on. One such soft drink consists of 3 parts of a mixture of calcium citrate, calcium malate, and calcium lactate, 3 parts of a mixture of fruit sugar and invert sugar, 4 parts of a mixture of orange juice and lemon juice, and 90 parts water. This is believed to calculate out to about 0.66% by weight calcium, about 2.4% by weight total acids and a weight ratio of total acids to calcium of about 3.63.

Japanese Patent Document No. 59-3710 to Takahara, published Feb. 20, 1984, discloses a calcium supplement drink containing calcium phosphate and/or calcium malate, a sugar alcohol such as sorbitol or mannitol, an organic acid such as malic or citric acid, and water. The sugar alcohol appears to be important in this drink for providing a clear solution. The ratio of calcium phosphate and/or calcium malate to sugar alcohol to organic acid can be 1 to 28–99 to 3–7.

DISCLOSURE OF THE INVENTION

The present invention relates to beverages, and beverage concentrates for preparing same, which are nutritionally supplemented with significant levels of calcium. The beverages of the present invention comprise:

(a) from 0.06 to 0.15% by weight solubilized calcium;

(b) from 0.24 to 1.05% by weight total acids selected from mixtures of citric acid, malic acid and phosphoric acid;

(c) a flavor component which contains no more than 40% fruit juice by weight on a single-strength basis; and (d) a sweetener other than a sugar alcohol. For the beverage concentrates of the present invention, the level of solubilized calcium is from 0.2 to 0.75% by weight and the level of total acids is from 0.7 to 5.25% by weight. These beverages and beverage concentrates are also substantially free of a sugar alcohol.

In addition to the specified levels of calcium and total acids, there are two other key aspects to the beverages and beverage concentrates of the present invention. One is the weight ratio of total acids to calcium. This weight ratio can range from 4 to 7 for beverages and beverage concentrates of the present invention. The other key aspect is the weight ratio of citric, malic and phosphoric acid within the acid mixture. Suitable weight ratios of these acids for beverages and beverage concentrates of the present invention are hereafter defined by selected areas in a ternary diagram.

The beverages of the present invention supply significant levels of nutritionally beneficial calcium. They have surprising stability against precipitation of insoluble calcium salts, even at relatively high levels of calcium. The initial mouthfeel and freedom from aftertaste of these beverages is also satisfactory, as is the absorbability/bioavailability of the calcium therefrom. Indeed, certain acid mixtures are preferred from the standpoint of the absorbability/bioavailability of calcium from the beverage.

A. BRIEF DESCRIPTION OF THE DRAWINGS

B. DEFINITIONS

Figure 1:
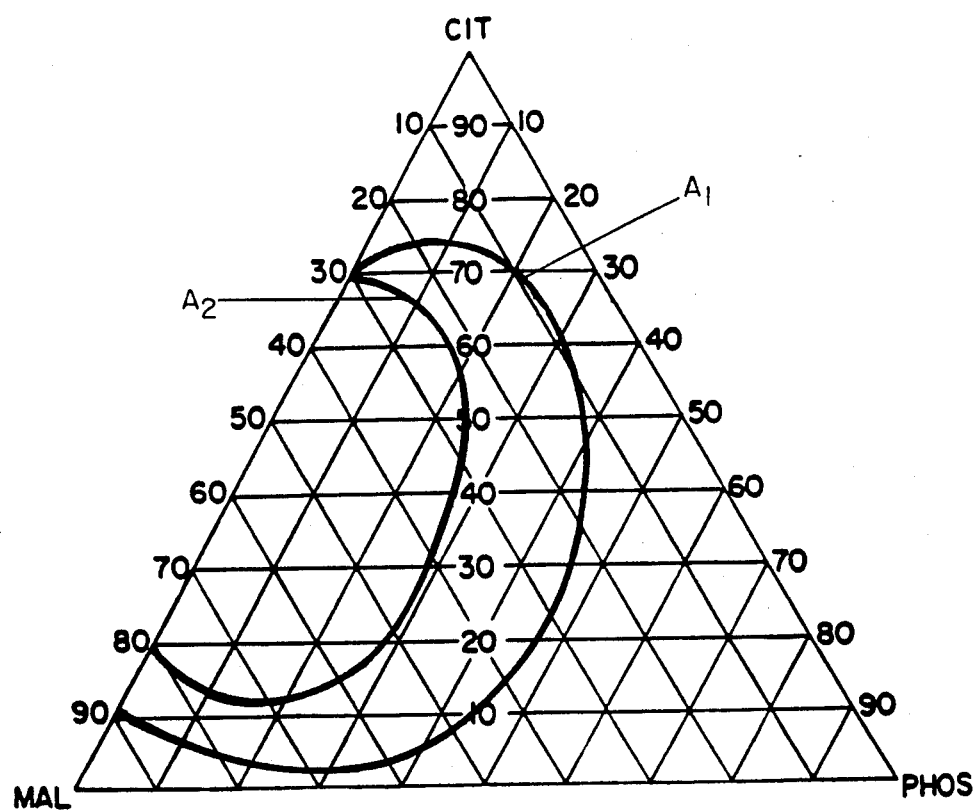
FIG. 1 represents a ternary diagram which defines suitable and preferred weight ratios of acids for beverages and beverage concentrates of the present invention.

As used herein, the term "beverage" refers to a beverage composition which is in a single-strength, ready-to-serve, drinkable form. Beverages of the present invention typically comprise at least 80% (preferably at least 85%) water. Beverages contemplated within the scope of the present invention include both carbonated and noncarbonated forms.

As used herein, the term "beverage concentrate" refers to a beverage composition in liquid form used to prepare a drinkable beverage. Beverage concentrates within the scope of the present invention typically comprise, from 30 to 70% (preferably from 40 to 60%) water. They are usually formulated to provide drinkable beverages when diluted with 3 to 5 parts by weight water.

As used herein, the term "beverage syrup" refers to a beverage concentrate which further comprises sugar. Beverage syrups typically comprise from 30 to 70% by weight sugar.

As used herein, the term "comprising" means various components can be conjointly employed in the beverages and beverage concentrates of the present invention. Accordingly, the term "comprising" encompasses the more restrictive terms "consisting essentially of" and "consisting of".

C. CALCIUM LEVELS, TOTAL ACID LEVELS, TOTAL ACIDS TO CALCIUM RATIOS AND ACID MIXTURES

The key nutritional component of the beverages and beverage concentrates of the present invention is calcium. Suitable sources of calcium include calcium carbonate, calcium phosphate, calcium hydrogen phosphate and calcium dihydrogen phosphate, calcium hydroxide, as well as the respective sour salts of calcium, e.g., calcium citrate or calcium malate. Calcium carbonate is a particularly preferred calcium source for taste and solubility reasons. To be useful in the present invention, the calcium needs to be "solubilized", i.e., dissolved, in the beverage or beverage concentrate. Accordingly, the amount of calcium included in the beverages and beverage concentrates of the present invention will be referred to in terms of "solubilized calcium", i.e., the amount of calcium ion dissolved.

For beverages of the present invention, calcium is present in an amount of at least 0.06% by weight. This minimum level of calcium (half of milk level) provides significant nutritional supplementation for the beverage. The maximum level of calcium is up to 0.15% by weight. As the level of calcium in the beverage is increased much beyond 0.15% by weight, satisfactory mouthfeel and stability properties become much more difficult to achieve. Preferably, the level of calcium in such beverages is from 0.10 to 0.15% by weight which includes milk level, i.e., 0.12% by weight.

With regard to beverage concentrates used to prepare beverages of the present invention, the amount of calcium present is from 0.2% to 0.75% by weight. Typically, beverages of the present invention are prepared from 3-fold (3×) to 5-fold (5×) beverage concentrates. Accordingly, the level of calcium is preferably in the range of from 0.3 to 0.75% by weight for these concentrates when they are used to prepare beverages having from 0.10 to 0.15% by weight solubilized calcium.

The key component for drinkable beverages and beverage concentrates of the present invention from the standpoint of stability against precipitation of insoluble calcium salts, mouthfeel/aftertaste quality and desirable absorbability/bioavailability benefits, is the acid component. This acid component is based on mixtures of citric acid, malic acid, phosphoric acid, i.e., citric/malic acid mixtures, citric/phosphoric acid mixtures, malic/phosphoric acid mixtures, and citric/malic/phosphoric acid mixtures. These acids can be present in their undisassociated form or else as the respective sour salts, i.e. citrate, malate, phosphate, hydrogen phosphate, dihydrogen phosphate, etc. If desired, other edible acids such as tartaric, fumaric, and the like can also be included in the beverages and concentrates of the present invention. (Because tartaric acid can cause precipitation of calcium, the level of this acid is preferably no more than 0.02% by weight of the beverage).

For the purposes of the present invention, the level of the acid component (hereafter total acids) depends on the beverage composition involved, the level of calcium included, as well as the mouthfeel and stability properties desired. For beverages having from 0.06 to 0.15% by weight solubilized calcium, the level of total acids can range from 0.24 to 1.05% by weight. (For beverage concentrates used to prepare such beverages, the level of total acids can range from 0.7 to 5.25% by weight). For beverages having 0.10 to 0.15% by weight solubilized calcium, the level of total acids preferably ranges from 0.4 to 1.05% by weight. (For beverage concentrates used to prepare such beverages, the level of total acids preferably ranges from 1.2 to 5.25% by weight).

There are two other important factors with regard to the beverages and beverage concentrates of the present invention. One is the weight ratio of total acids to calcium. For the purposes of the present invention, this weight ratio can range from 4 to 7. At weight ratios much below 4, it becomes much more difficult to stabilize the beverage and beverage concentrates against precipitation of insoluble calcium salts, especially at calcium levels of from 0.10 to 0.15% by weight. At weight ratios much above 7, the beverage becomes too sour from a taste standpoint. Preferred beverages and beverage concentrates of the present invention have a weight ratio of total acids to calcium of from 4.8 to 5.6.

The other important factor for beverages and beverage concentrates of the present invention is the particular weight ratios of the acids within the acid mixture. FIG. 1 represents a ternary diagram showing suitable and preferred weight ratios of acids for beverages and beverage concentrates of the present invention. Each apex of the ternary diagram represents a 1.00 weight ratio (100 weight percent) of the particular acid (citric acid, malic acid, or phosphoric acid). The area to the left of outer contour line $A_1$ defines suitable weight ratios of acids for beverages and beverage concentrates of the present invention, especially for calcium levels of from 0.10 to 0.15% by weight. The area to the left of inner contour line $A_2$ defines preferred weight ratios of acids which provide greater absorbability/bioavailability of calcium from beverages of the present invention.

The area of suitable weight ratios of acids defined by the area to the left of line $A_1$ of FIG. 1 was based primarily upon two criteria. The first criterion was stability of the beverages against precipitation of calcium salts over time. The beverages tested for stability contained aspartame as the sweetener, or contained no sweetener at all. Beverages which did not have any precipitate after a period of 60 days (at room temperature) were considered stable under this test format.

Figure 2:
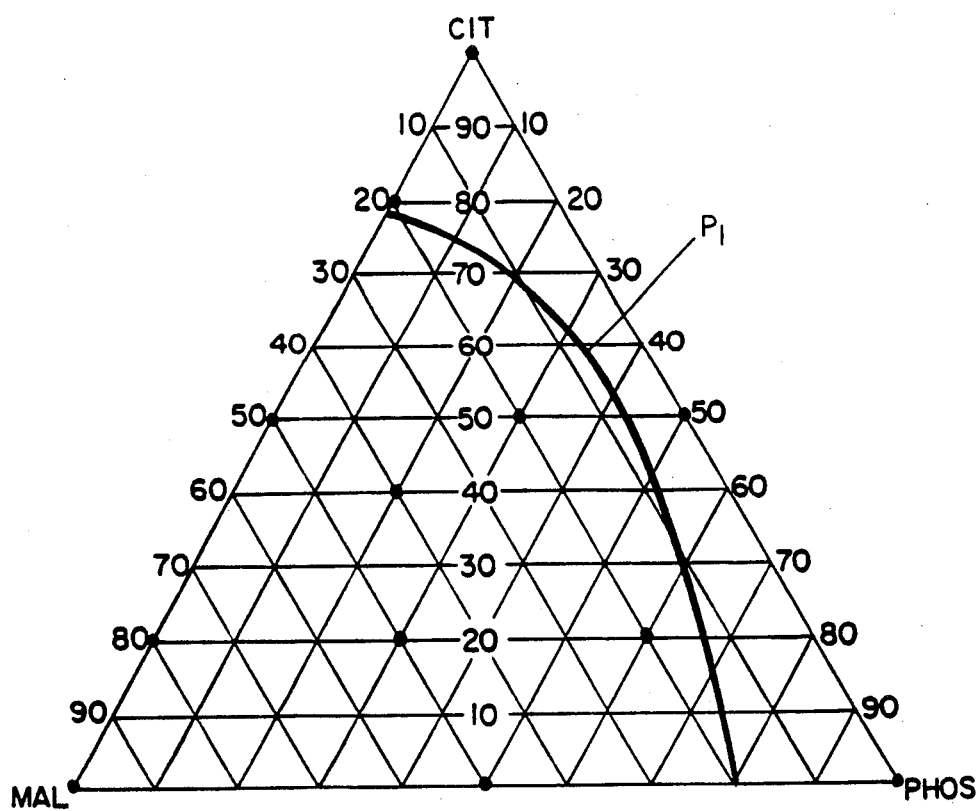
FIG. 2 represents a ternary diagram showing the effect of different weight ratios of acids on the precipitation stability of beverages having a calcium level of about 0.12% by weight.

FIG. 2 represents one ternary diagram showing stability against precipitation of beverages having different weight ratios of acids. The weight ratios of acids tested are shown by the dots in FIG. 2. The calcium level of the beverages was held constant at about 0.12% by weight, i.e., milk level. Also, the weight ratio of total acids to calcium was held constant at about 5 for all beverages. Those weight ratios of acids providing beverages stable against precipitation are defined by the area to the left of contour line $P_1$.

The other criterion used in defining suitable weight ratios of acids was the mouthfeel quality of the beverages. It has been found that mouthfeel actually involves two different sensations. One is initial mouthfeel impressions which usually occur within the first 10 to 15 seconds of consuming the beverage. The other mouthfeel sensation can occur long after the beverage is consumed, sometimes as much as 15 to 60 minutes later, and is hereafter referred to as "aftertaste".

Figure 3:
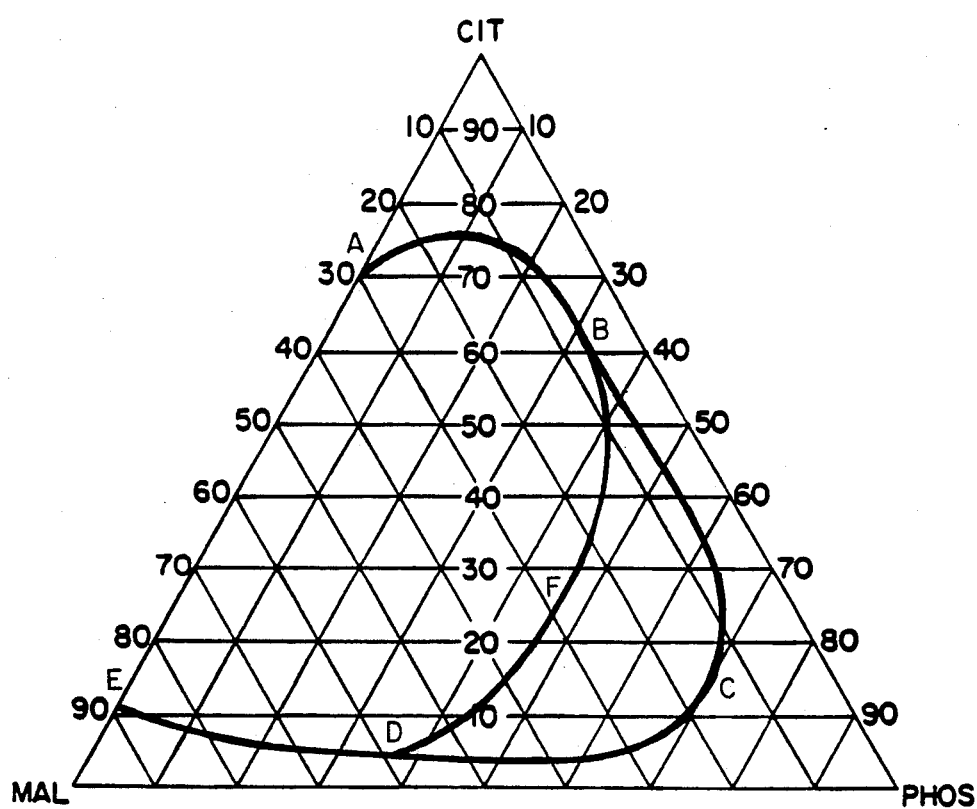
FIG. 3 represents a ternary diagram showing the effect of different weight ratios of acids on the initial taste/mouthfeel/aftertaste quality of beverages having a calcium level of about 0.12% by weight.

FIG. 3 represents a ternary diagram showing the effect of different weight ratios of acids on the initial mouthfeel/aftertaste properties of beverages having a calcium level of about 0.12% by weight. The area to the left of the contour line running through points A, B, C, D and E defines weight ratios of acids providing beverages having satisfactory initial taste/mouthfeel. The area to the left of the contour line running through points A, B, F, D and E defines weight ratios of acids providing beverages having satisfactory initial taste/mouthfeel and aftertaste properties.

The segments AB, BCD, DE and BFD which make up these contour lines were generated separately as follows: Segment AB was developed based on paneling of beverage samples containing 0.12% by weight calcium and acid systems consisting of (by weight of the acid system) 60 to 100% citric acid, 0 to 30% malic acid and 0 to 30% phosphoric acid. The total acids level for the samples ranged from 0.6 to 0.7% by weight depending upon the acid system used. Citric and citric/malic acid mixtures were paneled at 0.6% by weight total acids. Samples containing higher levels of phosphoric acid contained slightly more total acids to better match sourness between the samples paneled. In addition to calcium and the acids, all samples contained 0.05% sodium benzoate, 0.039% aspartame, 2% high fructose corn syrup-55, a citrus flavor and carbonation to 3.2 volumes $CO_2$. The samples were paneled among 3 to 15 expert tasters and were evaluated for taste and aftertaste level and quality, as well as mouthfeel effects during consumption of the sample. The results from this paneling were used to generate segment AB. Weight ratios of acids below segment AB had preferred mouthfeel and taste quality. Those weight ratios above segment AB had undesirable mouthfeel/taste qualities.

Segment BCD was developed based on paneling of beverage samples containing 0.12% by weight calcium and acid systems consisting of 30 to 100% phosphoric acid, 0 to 70% citric acid and 0 to 70% malic acid. The total acids level ranged from 0.5 to 0.55% (to match the cola flavor) and was adjusted to obtain equal sourness between samples. In addition to calcium and the acids, all samples contained 0.05% sodium benzoate, 0.039% aspartame, 2% high fructose corn syrup $-55$, a cola flavor and carbonation to 3.2 volumes $CO_2$. The samples were paneled like those for segment AB. The results from this paneling were used to generate segment BCD. Weight ratios of acids to the left of segment BCD had preferred mouthfeel and taste quality. Those weight ratios to the right of segment BCD had unpleasant/dispreferred mouthfeel and taste properties.

Segment DE was developed based on paneling of beverage samples containing 0.12% by weight calcium and acid systems consisting of 60 to 100% malic acid, 0 to 40% citric acid and 0 to 40% phosphoric acid. The total acids level for the samples was held constant at 0.6%. In addition to calcium and the acids, the samples contained 0.05% sodium benzoate, 0.05% aspartame, and a citrus flavor. The samples were paneled like those for segments AB and BCD. The results from this paneling were used to generate segment DE. Weight ratios of acids having preferred mouthfeel and taste qualities lie above segment DE. Those weight ratios having undesirable mouthfeel/taste qualities lie below segment DE.

Segment BFD was generated as follows: based on panel testing of beverage samples with a wide range of citric, malic and phosphoric acid weight ratios, it became apparent that beverages having 0.12% by weight calcium and a high level (50% or more by weight of acid system) phosphoric acid created an unpleasant, often delayed, lingering "bite/burn/dry" mouthfeel. The effect appeared to be cumulative (the more consumed, the worse the effect) and appeared to be correlated with the level of phosphoric acid used. Specific expert taste and consumption paneling of beverage samples containing a range of citric, malic and phosphoric acid weight ratios indicated that acid systems consisting of 40% phosphoric acid were about borderline with regard to acceptable mouthfeel/aftertaste. Samples, often of temporary physical stability, with 70%/30% phosphoric/citric acid or 100% phosphoric acid had very unpleasant, delayed mouthfeel which was characterized as an "aftertaste". Accordingly, segment BFD was drawn. Acid systems consisting of 50% or more phosphoric acid are to the right of this segment. It is these high level phosphoric acid systems which develop undesirable "aftertaste".

It is believed that this aftertaste phenomena can be related to the delayed precipitation of calcium salts and in particular calcium hydrogen phosphate. Basically, aftertaste effects occur when the saturation threshold of the acid mixture, in the presence of saliva, is exceeded. (Saliva typically raises the pH of beverage residue in the mouth from about 6.5 to about 8.0 which decreases the saturation threshold of the acids significantly.) Although the thermodynamics favor precipitation of calcium salts when this saturation threshold is exceeded, the kinetics are such that precipitation occurs much more slowly. Accordingly, this delayed precipitation results in a supersaturation of calcium salts and is sensed as an aftertaste in the mouth.

This aftertaste effect has also been demonstrated experimentally. Basically, this experiment involves mixing 1 part by weight of the beverage with 1 part by weight of a 0.04 M $NaHCO_3$ solution. (The $NaHCO_3$ solution functions like stimulated saliva which is, on average, 0.04 M in $NaHCO_3$). Those beverages for which the saturation threshold of the acid mixture would be exceeded in the mouth will eventually precipitate when the $NaHCO_3$ solution is added.

Figure 4:
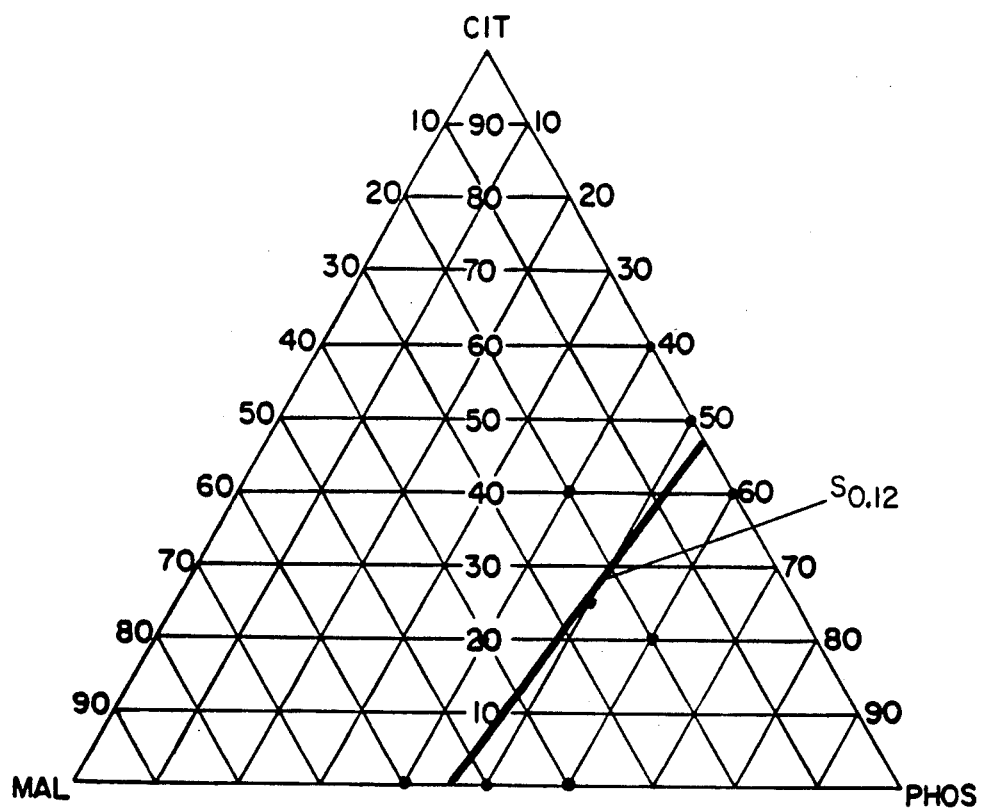
FIG. 4 represents a ternary diagram showing saturation thresholds in the mouth for beverages having a calcium level of about 0.12% by weight, based on a model system.

One such experiment involving beverages containing about 0.12% by weight calcium and a total acids to calcium weight ratio of about 5 is shown in FIG. 4. The weight ratios of acids evaluated are shown by the dots in FIG. 4. The line $S_{0.12}$ represents the saturation threshold for these beverages, i.e., all weight ratios of acids to the right of line $S_{0.12}$ will eventually precipitate when the $NaHCO_3$ solution is added. If FIGS. 3 and 4 are made into transparencies and overlaid, line $S_{0.12}$ is a close approximation of when aftertaste effects begin to occur in FIG. 3, i.e. to the right of segment BFD.

The ternary diagrams in FIGS. 2, 3, and 4 were made into transparencies. These transparencies were then overlaid, starting with FIG. 2 and ending with FIG. 4. An area of common preference was then developed based on the stability against precipitation (FIG. 2) and initial mouthfeel/aftertaste (FIGS. 3 and 4) criteria. This area was then used to generate contour line $A_1$ for the ternary diagram in FIG. 1.

Contour line $A_2$ of FIG. 1, which defines preferred weight ratios of acids providing greater absorbability/bioavailability of calcium from the beverage, was based on data obtained in experiments where the whole body retention of radiolabeled calcium ($^{47}Ca$) from beverages dosed to rats was measured. (Measurements of whole body retention of radiolabeled calcium are believed to accurately reflect combined absorbability and bioavailability of the calcium.) The beverages contained 0.105% by weight calcium. The area to the left of contour line $A_2$ defines those weight ratios of acids where calcium retention was 28% or greater based on the total amount of calcium in the beverage. (For beverages having weight ratios of acids defined within the area enclosed by contour line $A_1$, calcium retention is generally at least 17%).

D. FLAVOR COMPONENT

The flavor component of the beverages and beverage concentrates of the present invention contains a flavor selected from fruit flavors, botanical flavors and mixtures thereof. As used herein, the term "fruit flavor" refers to those flavors derived from the edible reproductive part of a seed plant, especially one having a sweet pulp associated with the seed. Also included within the term "fruit flavor" are synthetically prepared flavors made to simulate fruit flavors derived from natural sources. Particularly preferred fruit flavors are the citrus flavors including orange flavors, lemon flavors, lime flavors and grapefruit flavors. Besides citrus flavors, a variety of other fruit flavors can be used such as apple flavors, grape flavors, cherry flavors, pineapple flavors and the like. These fruit flavors can be derived from natural sources such as fruit juices and flavor oils, or else synthetically prepared.

As used herein, the term "botanical flavor" refers to flavors derived from parts of a plant other than the fruit. As such, botanical flavors can include those flavors derived from nuts, bark, roots and leaves. Also included within the term "botanical flavors" are synthetically prepared flavors made to simulate botanical flavors derived from natural sources. Examples of such flavors include kola flavors, tea flavors, and the like. These botanical flavors can be derived from natural sources such as essential oils and extracts, or else can be synthetically prepared.

The flavor component can comprise a blend of various flavors, e.g. lemon and lime flavors, kola flavors with citrus flavors to form cola flavors, etc. If desired, fruit juices such as orange juice, lemon juice, lime juice, apple juice, grape juice and the like can be used in the flavor component. The flavors in the flavor component are sometimes formed into emulsion droplets which are then dispersed in the beverage concentrate. Because these droplets usually have a specific gravity less than that of water and would therefore form a separate phase, weighting agents (which can also act as clouding agents) are typically used to keep the emulsion droplets dispersed in the beverage. Examples of such weighting agents are brominated vegetable oils (BVO) and rosin esters, in particular the ester gums. See L. F. Green, *Developments in Soft Drinks Technology*, Vol. 1, (Applied Science Publishers Ltd. 1978), pp. 87–93 (herein incorporated by reference), for a further description of the use of weighting and clouding agents in liquid beverages. Besides weighting agents, emulsifiers and emulsion stabilizers can be used to stabilize the emulsion droplets. Examples of such emulsifiers and emulsion stabilizers include the gums, pectins, celluloses, polysorbates, sorbitan esters and propylene glycol alginates. See L. F. Green, supra at p. 92.

The particular amount of the flavor component effective for imparting flavor characteristics to the beverages and beverage concentrates of the present invention ("flavor enhancing") can depend upon the flavor(s) selected, the flavor impression desired, and the form of the flavor component. For flavor components which are substantially free of fruit juice, i.e., on a single-strength basis, no more than 1% fruit juice by weight of the beverage, the flavor component can comprise at least 0.05% by weight of the beverage composition, and typically from 0.1 to 0.25% by weight for carbonated beverages. When fruit juices are used, the flavor component can comprise, on a single-strength basis, up to 40% fruit juice by weight of the beverage, preferably from 5 to 20% fruit juice by weight for carbonated beverages.

E. SWEETENERS

Beverages and beverage syrups of the present invention contain a sweetener other than a sugar alcohol. The sweetener typically used is sugar. As used herein, the term "sugar" refers to mono- and di-saccharide sweeteners. Examples of such sugars include sucrose, glucose, fructose, high fructose corn syrup, invert sugar and the like. Preferred sugars are sucrose and high fructose corn syrup. Sugars, especially high fructose corn syrup, have been found to enhance the absorbability/bioavailability of calcium from beverages of the present invention.

For diet beverages, noncaloric sweeteners can be used. Examples of such sweeteners include saccharin, cyclamates, acetosulfam, L-aspartyl-L-phenylalanine lower alkyl ester sweeteners, L-aspartyl-D-alanine amides disclosed in U.S. Pat. No. 4,411,925 to Brennan et al., issued Oct. 23, 1983 (herein incorporated by reference), L-aspartyl-D-serine amides disclosed in U.S. Pat. No. 4,399,163 to Brennan et al., issued Aug. 16, 1983 (herein incorporated by reference), L-aspartyl-L-1-hydroxymethylalkaneamide sweeteners disclosed in U.S. Pat. No. 4,338,346 to Brand, issued Dec. 21, 1982 (herein incorporated by reference), L-aspartyl-1-hydroxyethylalkaneamide sweeteners disclosed in U.S. Pat. No. 4,423,029 to Rizzi, issued Dec. 27, 1983 (herein incorporated by reference), and the like. The acid mixtures of the present invention can provide improved hydrolytic stability for beverages containing L-aspartyl-L-phenylalanine ester (e.g. aspartame) sweeteners in the critical pH range of from 4.0 to 4.8.

The amount of the sweetener effective in the beverages of the present invention depends upon the particular sweetener(s) used and the sweetness intensity desired. For noncaloric sweeteners, this amount varies depending upon the sweetness intensity of the particular sweetener. For sugar, this amount can be from 1 to 14% (typically from 6 to 14%) by weight for carbonated beverages. Preferred beverages contain from 9 to 13% by weight sugar. (In determining the amount of sugar for beverages of the present invention, any sugar or other sweetener present in the flavor component, such as in fruit juice, is also included.) Low-calorie sweetener combinations containing a noncaloric sweetener such as aspartame and a sugar such as high fructose corn syrup can also be used in beverages of the present invention. For beverage syrups of the present invention, the amount of sugar is significantly higher. Usually, the amount of sugar in a beverage syrup is from 30 to 70% by weight. Preferably, such beverage syrups contain from 40 to 60% by weight sugar.

The beverages, beverage concentrates and beverage syrups of the present invention are substantially free of a sugar alcohol, i.e. less than 1% by weight. The sugar alcohols include sorbitol, mannitol and xylitol. Sugar alcohols are sometimes used as sweeteners for food products. However, these sugar alcohols, which are noncaloric, are also metabolized by lower gut flora, causing flatulence and related gastrointestinal (GI) tract problems such as diarrhea. Accordingly, at the levels required to sweeten beverages, sugar alcohols are not useful in this present invention.

F. PH AND OTHER BEVERAGE INGREDIENTS

The pH of the beverages and beverage concentrates of the present invention is dependent upon the weight ratios of the acids, the total amount of acids and the sourness impression desired. Typically, the pH can range from 2.5 to 6.5. Preferred carbonated beverages have a pH of from 3.0 to 4.5.

Other minor beverage ingredients are frequently included in beverages and concentrates. Such ingredients include preservatives such as benzoic acid and salts thereof, sulfor dioxide, etc. Also, typically included are colors derived either from natural sources or synthetically prepared. See L. F. Green, *Developments in Soft Drinks Technology*, Vol. 1 (Applied Science Publishers Ltd. 1978), pp. 185–186 (herein incorporated by reference) for preservatives and colors used in beverages.

G. BEVERAGE PREPARATION

The beverages and concentrates of the present invention can be prepared by standard beverage formulation techniques. Although noncarbonated beverages are within the scope of the present invention, particular emphasis is given to the making of carbonated beverages. It should be understood, however, that carbonated beverage making techniques, when appropriately modified, are also applicable to noncarbonated beverages. Also, while the following description is with reference to sugar containing beverages, diet beverages containing noncaloric sweeteners can also be prepared by appropriate modification.

In making a sugar sweetened carbonated beverage, a beverage concentrate is usually formed containing from 30 to 70% by weight water. This beverage concentrate typically contains the emulsified or water-soluble flavors, emulsion stabilizing agents, and weighting agents if needed, any color desired and suitable preservatives. After the concentrate is formed, sugar and water are then added to make a beverage syrup. This beverage syrup is then mixed with an appropriate quantity of water to form the finished beverage. The weight ratio of water: syrup is from about 3:1 (3×syrup) to about 5:1 (5×syrup). Carbon dioxide can be introduced either into the water mixed with the beverage syrup or into the drinkable beverage to achieve carbonation. The carbonated beverage can then be placed in a container such as a bottle or can and then sealed. See L. F. Green, *Developments in Soft Drinks Technology*, Vol. 1, (Applied Science Publishers Ltd. 1978), pp. 102–107 (herein incorporated by reference), for a further description of beverage making, in particular the process for carbonation.

The amount of carbon dioxide introduced into the beverage can depend upon the particular flavor system used and the amount of carbonation desired. Usually, carbonated beverages of the present invention contain from 1.0 to 4.5 volumes of carbon dioxide. Preferred carbonated beverages contain from 2 to 3.5 volumes of carbon dioxide.

The calcium source and the acids (citric, malic, phosphoric) can be added at various points in this beverage concentrate-beverage syrup-carbonated beverage making process. The calcium source and acids are preferably added at the same point in this process, but can also be added at different points. Usually, the calcium source and acids are included during preparation of the beverage concentrate or during preparation of the beverage syrup.

SPECIFIC EMBODIMENTS OF BEVERAGES, BEVERAGE CONCENTRATES AND METHODS FOR MAKING SAME ACCORDING TO THE PRESENT INVENTION

The following are specific embodiments of beverages, beverage syrups and methods for making same in accordance with the present invention:

EMBODIMENT 1

A beverage syrup containing fruit juice was prepared as follows: malic acid (7.38 g.) and citric acid (7.38 g.) were mixed in water (500 g.) until dissolved. Calcium carbonate (7.65 g.) was then added and mixed until dissolved. High fructose corn syrup-55 (356.93 g.) was then added and mixed. Sodium benzoate (1.23 g.) was predissolved in water (80.21 g.) and then added. Finally, apple juice concentrate (79.21 g.) having a solids content of 72.1° Brix was added and mixed.

This beverage syrup was added to 16 oz. bottles at 200 g./bottle. Carbonated water (4.0 volumes $CO_2$) was added to each bottle to make 16 oz. (volume basis) of finished carbonated beverage having a carbonation level of about 2.3 volumes $CO_2$.

EMBODIMENT 2

The following ingredients were mixed together in the order indicated to provide a beverage syrup:

| Ingredient | Amount (g.) |
| --- | --- |
| Water | 3288.25 |
| High Fructose Corn Syrup-55 | 1785.10 |
| Citric Acid (anhydrous) | 28.28 |
| Malic Acid | 25.48 |
| 85% Phosphoric Acid | 27.70 |
| Calcium Carbonate | 39.03 |
| Sodium Benzoate | 6.16 |
| Total | 5200.00 |

This beverage syrup was added to 16 oz. bottles at 200 g./bottle. A lemon/lime flavor (0.474 ml.) was then added to each bottle. Carbonated water (4.68 volumes $CO_2$) was then added to each bottle to make 16 oz. (volume basis) of finished beverage having a carbonation level of 3.0 volumes $CO_2$ and a pH of 4.3.

EMBODIMENT 3

The following ingredients were mixed together in the order indicated to provide a diet beverage premix:

| Ingredient | Amount (g.) |
| --- | --- |
| Water | 4824.67 |
| High Fructose Corn Syrup-55 | 244.99 |
| Citric Acid (anhydrous) | 28.28 |
| Malic Acid | 25.48 |
| 85% Phosphoric Acid | 27.70 |
| Calcium Carbonate | 39.03 |
| Sodium Benzoate | 6.16 |
| Aspartame | 3.69 |
| Total | 5200.00 |

The beverage premix was added to 16 oz. bottles at 200 g./bottle. A lemon/lime flavor (0.474 ml.) was then added to each bottle. Carbonated water (4.68 volumes $CO_2$) was then added to each bottle to make 16 oz. (volume basis) of finished diet beverage having a carbonation level of 3.0 volumes $CO_2$ and a pH of 4.3.

EMBODIMENT 4

The following ingredients were mixed together in the order indicated to provide a premix.

| Ingredient | Amount (g.) |
| --- | --- |
| Water | 9450.98 |
| High Fructose Corn Syrup-55 | 4006.09 |
| Citric Acid | 102.26 |
| Malic Acid | 102.25 |
| Sodium Benzoate | 17.14 |
| Calcium Carbonate | 102.29 |
| Total | 13781.01 |

This premix was combined with the following ingredients in the order indicated to provide a beverage syrup:

| Ingredient | Amount (g.) |
| --- | --- |
| Premix | 13781.01 |
| Berry Flavor | 1.16 |
| 10% Citric Acid Solution | 184.8 |
| Water | 2940.47 |
| Total | 16907.44 |

This beverage syrup was added to 16 oz. bottles at 258 g./bottle. Carbonated water (5.2 volumes $CO_2$) was then added to each bottle to make 16 oz. (volume basis) of finished beverage having a carbonation level of 2.5 volumes $CO_2$.

EMBODIMENT 5

The following ingredients were mixed together in the order indicated to provide a diet beverage premix:

| Ingredient | Amount (g.) |
| --- | --- |
| Water | 1414.95 |
| High Fructose Corn Syrup-90 | 48.00 |
| Sodium Benzoate | 1.83 |
| Aspartame | 1.02 |
| Citric Acid | 11.4 |
| Malic Acid | 11.4 |
| Calcium Carbonate | 11.4 |
| Total | 1500.00 |

The beverage premix was added to 10 oz. bottles at 123 g./bottle. Berry flavor (2.22 g.) was then added to each bottle. A 10% citric acid solution (1.8 g.), 10% black currant flavor (0.075 ml.) and water (35 g.) were then added to each bottle. Carbonated water (about 5.2 volumes $CO_2$) was then added to each bottle to provide 10 oz. (volume basis) of finished diet beverage having a carbonation level of 2.4 volumes $CO_2$.

For Embodiments 1 to 5, the level of calcium (Ca) and total acids (TA) in the finished beverage, the total acids/Ca weight ratio (TA/Ca) and the citric/malic/phosphoric acid weight ratios (cit/mal/phos) are shown in the following Table:

| Embod. | Ca (%) | TA (%) | TA/Ca | cit/mal/phos |
|---|---|---|---|---|
| 1 | 0.12 | 0.67* | 5.58 | 44/56/0* |
| 2 | 0.13 | 0.62 | 4.95 | 37/33/30 |
| 3 | 0.13 | 0.62 | 4.95 | 37/33/30 |
| 4 | 0.13 | 0.71 | 5.45 | 54/46/0 |
| 5 | 0.13 | 0.63 | 5.04 | 50/50/0 |

*acids added plus acids in juice concentrate

What is claimed is:

1. A beverage substantially free of a sugar alcohol, which comprises:
   (a) from 0.06 to 15% by weight solubilized calcium;
   (b) from 0.24 to 1.05% by weight of an acid component selected from mixtures of citric acid, malic acid and phosphoric acid, said acid mixtures being defined by the area to the left of contour line $A_1$ of FIG. 1;
   (c) the weight ratio of said acid component to said solubilized calcium being from 4 to 7;
   (d) a flavor component which contains a flavor selected from the group consisting of fruit flavors, botanical flavors and mixtures thereof in an amount effective to impart flavor characteristics to the beverage and which contains no more than 40% fruit juice by weight on a single-strength basis; and
   (e) an effective amount of a sweetener other than a sugar alcohol.

2. The beverage of claim 1 which comprises from 0.10 to 0.15% by weight of said solubilized calcium and from 0.4 to 1.05% by weight of said solubilized calcium and from 0.4 to 1.05% weight of said acid component.

3. The beverage of claim 2 wherein said acid mixtures are defined by the area to the left of contour line $A_2$ of FIG. 2.

4. The beverage of claim 2 wherein said sweetener comprises from 6 to 14% by weight sugar.

5. The beverage of claim 4 wherein said sugar is high fructose corn syrup.

6. The beverage of claim 2 wherein said sweetener comprises a noncaloric sweetener.

7. The beverage of claim 6 wherein said noncaloric sweetener comprises aspartame.

8. The beverage of claim 2 which is carbonated with from 1.0 to 4.5 volumes of carbon dioxide.

9. The carbonated beverage of claim 8 which contains from 2 to 3.5 volumes of carbon dioxide.

10. The carbonated beverage of claim 9 wherein said flavor component comprises from 5 to 20% fruit juice by weight of the beverage.

11. The carbonated beverage of claim 9 wherein said flavor component is substantially free of fruit juice.

12. The beverage of claim 2 wherein the weight ratio of said acid component to said solubilized calcium is from 4.8 to 5.6.

13. A beverage concentrate in liquid form for preparing a drinkable beverage which is substantially free of a sugar alcohol, and which comprises:
   (a) from 0.2 to 0.75% by weight solubilized calcium;
   (b) from 0.7 to 5.25% by weight of an acid component selected from mixtures of citric acid, malic acid, and phosphoric acid, said acid mixtures being defined by the area to the left of contour line $A_1$ of FIG. 1;
   (c) the weight ratio of said acid component to said solubilized calcium being from 4 to 7; and
   (d) a flavor component which contains a flavor selected from the group consisting of fruit flavors, botanical flavors and mixtures thereof in an amount effective to impart flavor characteristics to the prepared drinkable beverage and which contains no more than 40% fruit juice by weight on a single-strength basis.

14. The concentrate of claim 13 which comprises from 0.30 to 0.75% by weight of said solubilized calcium and from 1.2 to 5.25% by weight of said acid component.

15. The concentrate of claim 14 wherein said acid mixtures are defined by the area to the left of contour line $A_2$ of FIG. 1.

16. The concentrate of claim 15 which comprises from 30 to 70% by weight water.

17. The concentrate of claim 16 which further comprises from 30 to 70% by weight sugar.

18. The concentrate of claim 16 wherein said sugar is high fructose corn syrup.

19. The concentrate of claim 14 wherein the weight ratio of said acid component to said solubilized calcium is from 4.8 to 5.5

20. The beverage of claim 2 which comprises no more than 0.02% by weight tartaric acid.

* * * * *

UNITED STATES PATENT AND TRADEMARK OFFICE
CERTIFICATE OF CORRECTION

PATENT NO. : 4,737,375

DATED : April 12, 1988

INVENTOR(S) : Nakel et al

It is certified that error appears in the above-identified patent and that said Letters Patent is hereby corrected as shown below:

In Col. 13, line 22 after "to", please delete "15%" and insert therefor --0.15%--.

Signed and Sealed this

Sixth Day of October, 1992

Attest:

DOUGLAS B. COMER

*Attesting Officer*     *Acting Commissioner of Patents and Trademarks*